United States Patent [19]
Foster

[11] Patent Number: 5,539,627
[45] Date of Patent: Jul. 23, 1996

[54] TREE STAND LOCATING DEVICE

[76] Inventor: Robert G. Foster, 89 W. Lee St., Hangerstown, Md. 21740

[21] Appl. No.: 553,046

[22] Filed: Nov. 3, 1995

[51] Int. Cl.⁶ .................................................. F21V 33/00
[52] U.S. Cl. .................. 362/253; 362/396; 362/191; 368/256
[58] Field of Search .................................. 362/191, 205, 362/396, 253, 382; 340/540; 368/256; 248/205.2

[56] References Cited

U.S. PATENT DOCUMENTS

| | | | |
|---|---|---|---|
| 2,460,634 | 2/1949 | Heckmer, Sr. | 368/256 |
| 2,849,596 | 8/1958 | McDermott | 362/191 |
| 3,798,889 | 3/1974 | Chadwick | 368/256 |
| 4,623,957 | 11/1986 | Moore et al. | 362/191 |
| 5,309,145 | 5/1994 | Branch et al. | 340/540 |
| 5,327,331 | 7/1994 | Roberts | 368/256 |
| 5,469,346 | 11/1995 | Haut et al. | 362/205 |

*Primary Examiner*—James C. Yeung

[57] ABSTRACT

A tree stand locating device including a first housing unit that has a front face, a rear face, and a pair of side panels. The first housing unit has an alarm clock mechanism with a clock body. The side panels of the first housing unit each have a pile-type fastener assembly attached. The rear panel has a cover section positioned along a lower portion. Included is a second housing unit that is coupled to the first housing unit along a bottom panel. Provided is a strap that has the interior surface of the first end and the second end each with a pile-type fastener assembly thereon for coupling the pile-type fastener assembly of each side panel of the first housing unit. A light mechanism is positioned within the second housing unit and activated when a preset time on the clock arrives. Lastly, a switch mechanism directs the time counted to send a current to the light mechanism, when the first housing unit is hung from the limb above a tree stand.

9 Claims, 3 Drawing Sheets

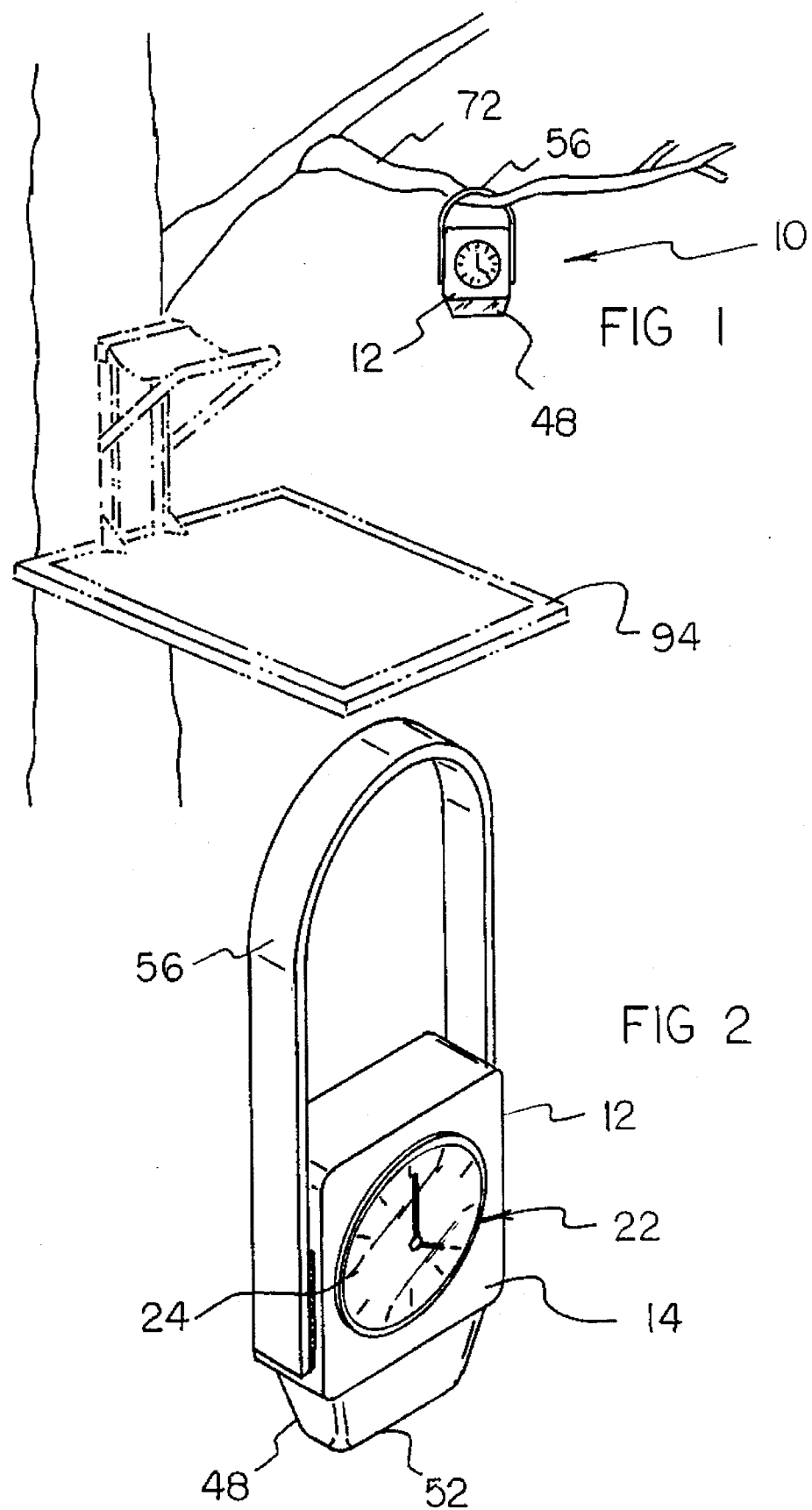

TREE STAND LOCATING DEVICE

BACKGROUND OF THE INVENTION

1. Field of the Invention

The present invention relates to a tree stand locating device and more particularly pertains to providing illumination of a tree stand when the device is hung over a limb near the stand, and the illumination mechanism is activated by a timing means.

2. Description of the Prior Art

The use of light and clock combinations is known in the prior art. More specifically, light and clock combinations heretofore devised and utilized for the purpose of viewing time displays are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 347,634 to Lobo discloses a combined radio, alarm clock and light. U.S. Pat. No. 5,309,145 to Branch, O'connor, and Thurston discloses a travel convenience and security device. U.S. Pat. No. 5,121,096 to Moore and Wilson discloses a position locating device. U.S. Pat. No. Des. 326,726 to Swain, Jr. discloses a combined night light and alarm clock. U.S. Pat. No. 5,212,672 to Loisch and Harriger discloses a timing control apparatus. Lastly, U.S. Pat. No. 4,493,395 to Rittenhouse discloses a tree stand for hunters.

While these devices fulfill their respective, particular objectives and requirements, the aforementioned patents do not describe tree stand locating device that allows hunters to locate their tree stand or hunting area before daybreak by hanging the device over the branch of a tree and presetting the clock to activate the light mechanism.

In this respect, the tree stand locating device according to the present invention substantially departs from the conventional concepts and designs of the prior art, and in doing so provides an apparatus primarily developed for the purpose of providing illumination of a tree stand when the device is hung over a limb near the stand, and the illumination mechanism is activated by a timing means.

Therefore, it can be appreciated that there exists a continuing need for a new and improved tree stand locating device which can be used for providing illumination of a tree stand when the device is hung over a limb near the stand, and the illumination mechanism is activated by a timing means. In this regard, the present invention substantially fulfills this need.

SUMMARY OF THE INVENTION

In view of the foregoing disadvantages inherent in the known types of light and clock combinations now present in the prior art, the present invention provides an improved tree stand locating device. As such, the general purpose of the present invention, which will be described subsequently in greater detail, is to provide a new and improved tree stand locating device and method which has all the advantages of the prior art and none of the disadvantages.

To attain this, the present invention essentially comprises a generally rectangular first housing unit that has a front face, a rear face, and a pair of side panels. The first housing unit has an alarm clock mechanism. The alarm clock mechanism has a clock face for displaying the time as counted by the clock. The clock face is displayed at the front face of the first housing unit. The clock mechanism has a clock body positioned within the first housing unit. The side panels of the first housing unit, each have a pile-type fastener assembly attached. Each pile-type fastener assembly covers about eighty-five percent of a length of each side panel. The rear panel has a cover section that is positioned along a lower portion. The cover section may be removed from the rear panel to expose a battery compartment within the first housing unit. The battery compartment is capable of housing two batteries for energizing the clock mechanism. Also, a generally rectangular second housing unit is coupled to the first housing unit along a bottom panel. The second housing unit has a plurality of opaque walls. The second housing unit has a base common with the bottom panel of the first housing unit. Included is an elongated strap that has a first end, a second end, and an intermediate portion. The strap has a width of about one inch and a length of about twelve inches. The strap has an interior surface, with the interior surface of the first end and the second end each having a pile-type fastener assembly. The pile-type fastener assemblies of the first and second end are capable of coupling with the pile-type fastener assemblies of the first housing unit. The strap allows the first and second housing units, with the clock mechanism, to hang from a tree limb when the strap is coupled to the first housing unit. A light mechanism is positioned within the second housing unit. The light mechanism has a bulb extending into the second housing unit and a bulb base that is coupled with the base of the second housing unit. The bulb has a current wire that extends therefrom and is coupled to the lock mechanism. The light mechanism is activated by a current that is passed into the bulb when a preset time on the clock arrives. Lastly, a switch mechanism extends from the rear face of the first housing unit and is fixedly attached to the clock body of the clock mechanism. The switch directs the display of time counted on the clock face. The switch directs the time counted to send a current to the light mechanism for illumination, whereby the light mechanism, when activated, provides an ultra-bright beam for emitting through the opaque walls of the second housing unit, when the first housing unit is hung from the limb above a tree stand.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tree stand-locating device which has all of the advantages of the prior art light and clock combinations and none of the disadvantages.

It is another object of the present invention to provide a new and improved tree stand locating device which may be easily and efficiently manufactured and marketed.

It is further object of the present invention to provide a new and improved tree stand locating device which is of durable and reliable constructions.

An even further object of the present invention is to provide a new and improved tree stand locating device which is susceptible of a low cost of manufacture with regard to both materials and labor, and which accordingly is then susceptible of low prices of sale to the consuming public, thereby making such tree stand locating device economically available to the buying public.

Still yet another object of the present invention is to provide a new and improved tree stand locating device which provides in the apparatuses and methods of the prior art some of the advantages thereof, while simultaneously overcoming some of the disadvantages normally associated therewith.

Even still another object of the present invention is to provide a tree stand locating device for providing illumination of a tree stand when the device is hung over a limb near the stand, and the illumination mechanism is activated by a timing means.

Lastly, it is an object of the present invention to provide a new and improved tree stand locating device including a first housing unit that has a front face, a rear face, and a pair of side panels. The first housing unit has an alarm clock mechanism with a clock body positioned within. The side panels of the first housing unit each have a pile-type fastener assembly attached. The rear panel has a cover section positioned along a lower portion and removable. Included is a second housing unit that is coupled to the first housing unit along a bottom panel. Provided is a strap that has a first end, a second end, and an interior surface. The interior surface of the first end and the second end each have a pile-type fastener assembly thereon for coupling the pile-type fastener assembly of each side panel of the first housing unit. A light mechanism is positioned within the second housing unit and capable of being activated by a current passing into a bulb when a preset time on the clock arrives. Lastly, a switch mechanism extends from the clock body through the rear face of the first housing to direct the time counted to send a current to the light mechanism, when the first housing unit is hung from the limb above a tree stand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the tree stand locating device constructed in accordance with the principles of the present invention.

FIG. 2 is an isometric elevational view of the present invention.

The same reference numerals refer to the same parts through the various Figures.

DESCRIPTION OF THE PREFERRED EMBODIMENT

Figure 3:
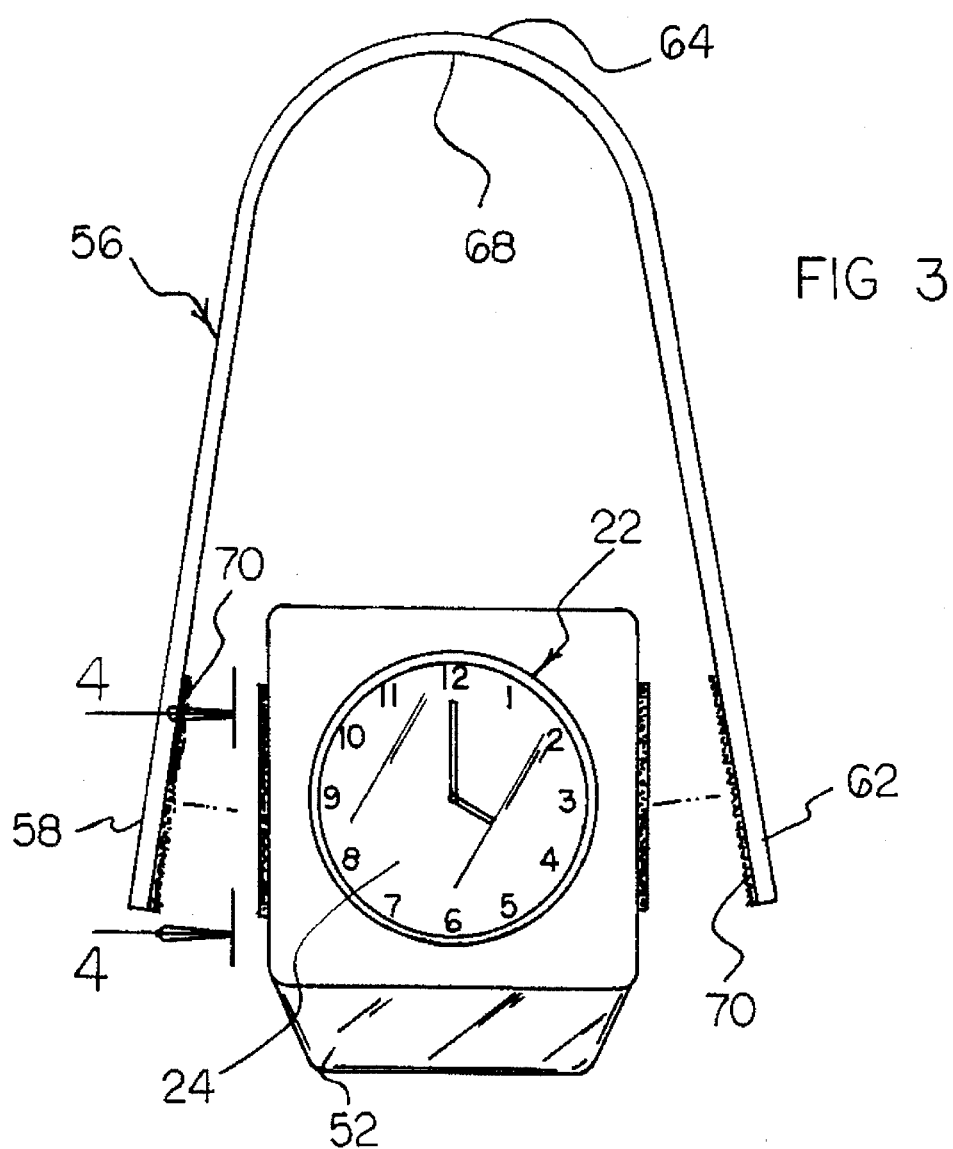
FIG. 3 is a front exploded view of the present invention.

With reference now to the drawings, and in particular to FIG. 1 thereof, the preferred embodiment of the new and improved tree stand locating device embodying the principles and concepts of the present invention and generally designated by the reference numeral 10 will be described.

The present invention, the tree stand locating device 10 is comprised of a plurality of components. Such components in their broadest context include a pair of housing units, a strap, a clock mechanism, and a light mechanism. Such components are individually configured and correlated with respect to each other so as to attain the desired objective.

Figure 6:
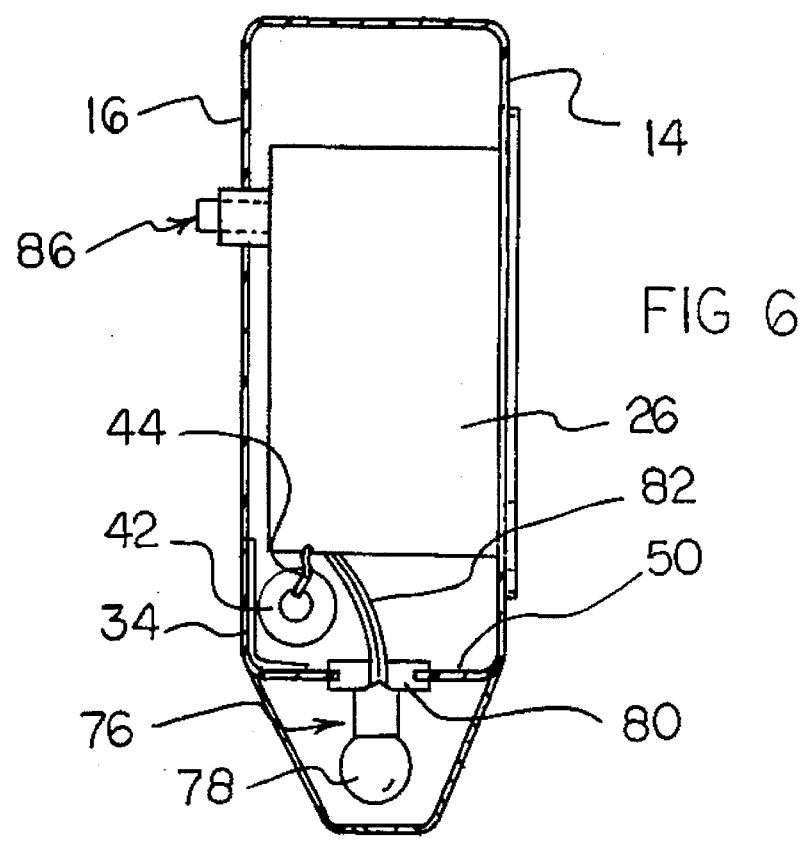
FIG. 6 is a cross sectional view of the present invention taken along line 6—6 of FIG. 5.

Specifically, the present invention includes a generally rectangular first housing unit 12. The first housing unit has a front face 14, a rear face 16, and a pair of side panels 18. The first housing unit is formed of a rigid thermoplastic material. The housing unit is sized so as to fit in a shirt or coat pocket. The first housing unit has an alarm clock mechanism 22 positioned within. The clock mechanism is a commercially available quartz clock that has hands and numerical indicia. The clock mechanism has a clock face 24 that displays the time as counted by the clock, as shown in FIG. 2. The clock face is displayed at the front face of the first housing unit. The clock mechanism has a clock body 26 that is positioned within the first housing unit, as depicted in FIG. 6.

Figure 5:
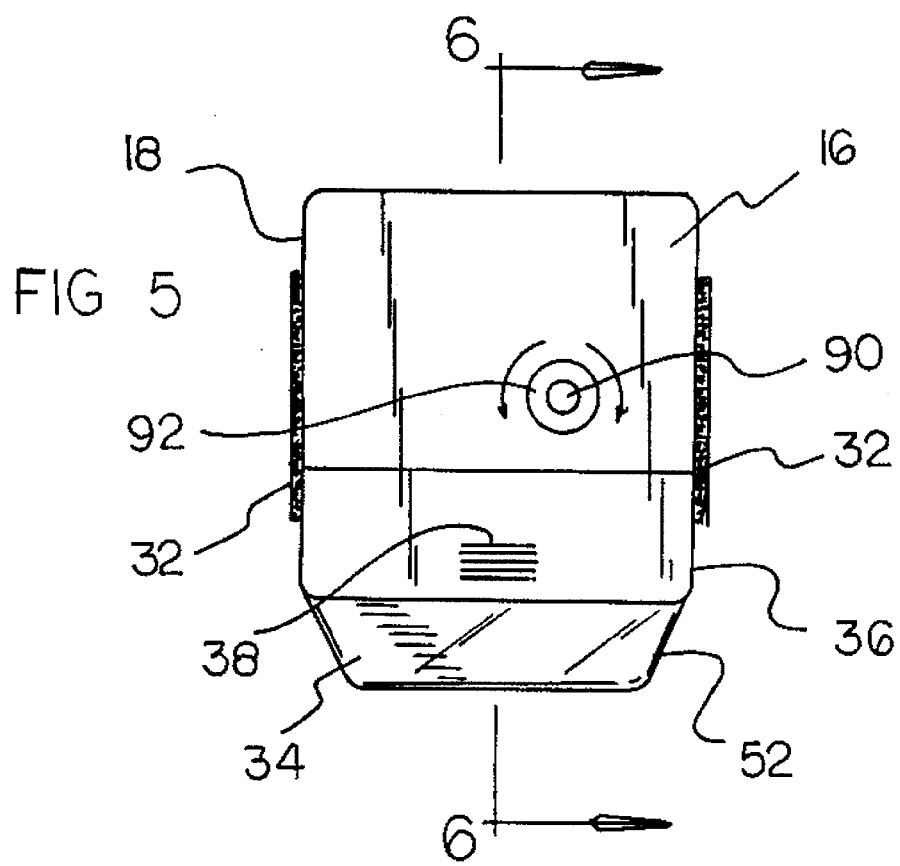
FIG. 5 is a rear view of the present invention of FIG. 1.

The side panels 18 of the first housing unit 12, each have a pile-type fastener assembly 32 attached, as shown in FIG. 5. Each pile-type fastener assembly covers about eighty-five percent of a length of each side panel. The rear panel 16 has a cover section 34 that is positioned along a lower portion 36 of the rear panel. The cover section has a plurality of risers 38 to assist in cover movement. The cover section may be removed from the rear panel to expose a battery compartment 42 within the first housing unit. The battery compartment, as shown in FIG. 6, has a wire 44 going into the clock mechanism. The battery compartment is capable of housing two 1.5 volt AA batteries for energizing the clock mechanism 22.

As best illustrated in FIG. 2, a generally rectangular second housing unit 48 is provided. The second housing unit is coupled to the first housing unit 12 along a bottom panel 50. The second housing unit is formed of a thermoplastic resin or polymer. The second housing unit has a plurality of opaque walls 52. The second housing unit has a base 50 common with the bottom panel of the first housing unit 12, as shown in FIG. 6. The second housing unit, generally is equal in width and length to a width and length of the first housing unit.

Additionally, an elongated strap 56 is provided. The strap has a first end 58, a second end 62, and an intermediate portion 64. The strap, of FIG. 3, has a width of about one inch and a length of about twelve inches. The strap is formed of a semi-rigid and flexible plastic. The strap may be formed from a flexible metal. The strap has an interior surface 68. The interior surface of the first end and the second end each have a pile-type fastener assembly 70. The pile-type fastener assemblies of the first and second end are capable of coupling with the pile-type fastener assemblies 32 of the first housing unit 12. The strap allows the first and second housing units, with the clock mechanism therein, to hang from a tree limb 72, when the strap is coupled to the side panels of the first housing unit. As best illustrated in FIG. 1, the strap supports the housing units in the tree.

Included is a light mechanism 76. The light mechanism is positioned within the second housing unit 48. As shown in FIG. 6, the light mechanism has a bulb 78 that extends into the second housing unit, and a bulb base 80 that is coupled with the base 50 of the second housing unit. The bulb has a current wire 82, that extends from the bulb base and couples to the lock mechanism 22. The bulb base is formed of polyvinylchloride or similar plastic, that has a high heat resistance. The light mechanism is activated by a current passing into the bulb, through the wire, when a preset time on the clock arrives.

Figure 4:
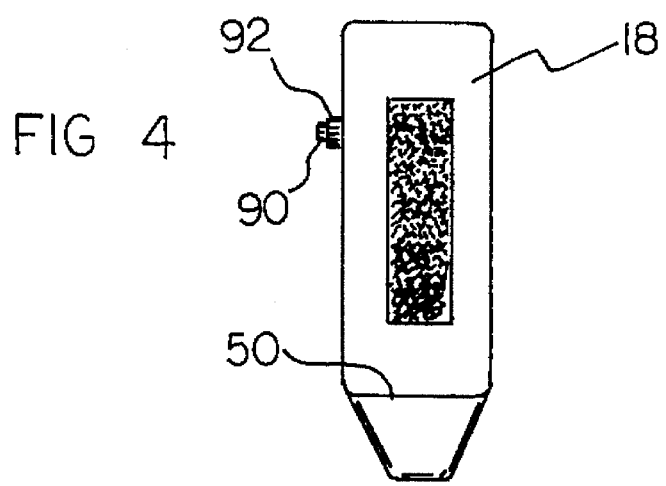
FIG. 4 is a side panel view of the present invention taken at line 4—4 of FIG. 3.

Lastly, a switch mechanism 86 extends from the rear face of the first housing unit 12. The switch, as shown in FIG. 4, has an inner turn knob 90 and an outer turn 92, each fixedly attached to the clock body of the clock mechanism 22. The outer turn knob of the switch is capable of directing the display of the time counted on the clock face. The inner turn knob of the switch is capable of directing the time to be preset to a time counted to send a current to the light mechanism for illumination. When the preset time arrives, the light mechanism is activated and provides an ultra-bright beam that emitting through the opaque walls of the second housing unit, when the straps hold the first housing unit from the limb of a tree stand 94.

The present invention is a tree stand locating device that has an automatically signal light that will help hunter's locate their hunting stand in the dark. The clock mechanism of the device is a standard quartz alarm clock, that is connected to a microlight that replaces the alarm of the clock. The bulb of the light is mounted within an opaque or plastic second housing and can be replaced when necessary. To use the device, simply set the alarm of the clock. When the set time arrives, the light automatically comes on and will remain on for thirty minutes before shutting off. The light may be manually turned off by turning the inner turn knob of the device. The first and second housing units of the device are plastic housing units that are water resistant and come with a hanging strap. The strap is attached to the housing units with pile-type fastener assemblies. The device is easily hung from a tree limb near the attached tree stand by using the strap. The device of the present invention is easy to use as an alarm clock. It is battery powered, and the light is useful in dim light before dawn, in fog, in snow, or rain. The device is very helpful in marking the location of the hunter's tree stand if the hunter has to leave the stand during the daylight hours and return after dark.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved tree stand locating device for assisting hunters comprising in combination:

a generally rectangular first housing unit having a front panel, a rear panel, a bottom panel and a pair of side panels, the first housing unit having an alarm clock mechanism therein, the clock mechanism having a clock face for displaying the time as counted by the clock, the clock face being displayed at the front panel of the first housing unit, the clock mechanism having a clock body positioned within the first housing;

the side panels of the first housing unit each having a pile-type fastener assembly attached thereto, each pile-type fastener assembly covers about 85 percent of a length of each side panel, the rear panel having a cover section positionable along a lower portion thereof, the cover section capable of being removed from the rear panel for exposure of a battery compartment within the first housing unit, the battery compartment being capable of housing two batteries for energizing the clock mechanism;

a generally rectangular second housing unit being coupled to the first housing unit along the bottom panel thereof, the second housing unit having a plurality of opaque walls and having a base common with the bottom panel of the first housing unit;

an elongated strap having a first end, a second end and an intermediate portion therebetween, the strap having a width of about 1 inch and a length of about 12 inches, the strap having an interior surface with the interior surface of the first end and the second end each having a pile-type fastener assembly thereon, the pile-type fastener assemblies of the first and second end being capable of coupling with the pile-type fastener assemblies of the first housing unit, the strap being capable of allowing the first and second housing unit with the clock mechanism therein to hang from a tree limb when the strap being coupled thereto;

a light mechanism being positionable within the second housing unit, the light mechanism having a bulb extending into the second housing unit and a bulb base being coupled with the base of the second housing unit, the bulb having a current wire extending therefrom and being coupled to the clock mechanism, the light mechanism being capable of being activated by a current being passed into the bulb when a preset time on the clock arrives; and a switch mechanism extending from the rear panel of the first housing and being fixedly attached to the clock body of the clock mechanism therein, the switch being capable of directing the display of the time counted on the clock face, the switch being capable of directing the time counted to send the current to the light mechanism for illumination whereby the light mechanism being activated provides an ultra bright beam for emitting through the opaque wall of the second housing unit when the first housing unit being hung from the limb above a tree stand.

2. The tree stand locating device comprising:

a first housing unit having a front panel, a rear panel, a bottom panel and a pair of side panels, the first housing unit having an alarm clock mechanism with a clock body positioned within;

the side panels of the first housing unit each having a pile-type fastener assembly attached thereto, the rear panel having a cover section positionable along a lower portion and removable therefrom;

a second housing unit being coupled to the first housing unit along the bottom panel thereof;

a strap having a first end, a second end and an interior surface, the interior surface of the first end and the second end each having a pile-type fastener assembly thereon for coupling the pile-type fastener assembly of each side panel of the first housing unit;

a light mechanism being positionable within the second housing unit and capable of being activated by a current passing into a bulb when a preset time on the clock arrives; and a switch mechanism extending from the clock body and through the rear panel of the first housing for directing the time counted to send the current to the light mechanism when the first housing unit being hung from a tree limb near a tree stand.

3. The tree stand locating device as set forth in claim 2 wherein the clock mechanism of the first housing unit having a clock face being displayed at the front panel of the first housing and displaying the time as counted by the clock.

4. The tree stand locating device as set forth in claim 2 wherein each pile-type fastener assembly of the side panels of the first housing unit cover about 85 percent of a length of each side panel, and the cover section being removed from the rear panel exposes a battery compartment within the first housing unit, and the battery compartment being capable of housing two batteries for energizing the clock mechanism.

5. The tree stand locating device as set forth in claim 2 wherein the second housing unit having a base common with the bottom panel of the first housing unit and a plurality of opaque walls being capable of allowing light from the light mechanism to pass therethrough.

6. The tree stand locating device as set forth in claim 2 wherein the strap being elongated and having an intermediate portion capable of being in contact with the tree limb, the strap having a width of about 1 inch and a length of about 12 inches, and the strap capable of allowing the first and second housing unit with the clock mechanism therein to hang from the limb when the strap being coupled to the side panels.

7. The tree stand locating device as set forth in claim 2 wherein the light mechanism having a bulb and a bulb base, the bulb extending into the second housing unit while the bulb base being coupled with the base of the second housing unit, the light mechanism having a current wire extending from the bulb base and being coupled to the clock mechanism.

8. The tree stand locating device as set forth in claim 7 wherein the light mechanism being capable of illumination when the light mechanism being activated provides an ultra bright beam for emitting through a plurality of opaque walls of the second housing unit.

9. The tree stand locating device as set forth in claim 2 wherein the switch mechanism being fixedly attached to the clock body and capable of directing the display of the time counted on the clock face.

* * * * *